United States Patent [19]

Takase et al.

[11] Patent Number: 4,669,440
[45] Date of Patent: Jun. 2, 1987

[54] FUEL INJECTION DETECTING SYSTEM FOR A DIESEL ENGINE

[75] Inventors: Sadao Takase, Yokohama; Yoshihisa Kawamura; Toyoaki Nakagawa, both of Yokosuka, all of Japan

[73] Assignee: Nissan Motor Company, Limited, Japan

[21] Appl. No.: 437,680

[22] Filed: Oct. 29, 1982

[30] Foreign Application Priority Data

Nov. 11, 1981 [JP] Japan .................................. 56-179595
Feb. 4, 1982 [JP] Japan .................................. 57-15586

[51] Int. Cl.$^4$ ............................................. F02M 39/00
[52] U.S. Cl. .................................... 123/494; 123/478; 119 A/73
[58] Field of Search ................. 123/494, 478, 446; 73/119 A

[56] References Cited

U.S. PATENT DOCUMENTS

| 4,090,404 | 5/1978 | Dupont et al. | 73/119 A |
| 4,102,181 | 7/1978 | Cser et al. | 73/119 A |
| 4,130,013 | 12/1978 | Bailey | 73/119 A |
| 4,185,494 | 1/1980 | Yelke | 73/119 A |
| 4,266,427 | 5/1981 | Wesley | 73/119 A |
| 4,359,032 | 11/1982 | Ohie | 123/478 |

FOREIGN PATENT DOCUMENTS

| 2658253 | 7/1977 | Fed. Rep. of Germany | 123/478 |
| 2325816 | 9/1975 | France | 123/478 |
| 2051230 | 1/1981 | United Kingdom | 123/478 |

Primary Examiner—Carl Stuart Miller
Attorney, Agent, or Firm—Lowe, Price, Leblanc, Becker & Shur

[57] ABSTRACT

A fuel injection detecting system is used with a diesel engine having a fuel injection nozzle, the nozzle including a movable member for effecting fuel injection into the engine when the valve member is displaced from its normal position and interrupting fuel injection when the valve member is returned to its normal position. The detecting system includes a sensor for sensing displacement of the valve member and generating a signal indicative thereof. A comparator is provided to compare the signal from the sensor with a reference signal and to generate a signal indicative of fuel injection via the nozzle. The detecting system also includes a device for preventing the fuel injection signal from including components unrelated to fuel injection via the nozzle. This device may disable the sensor for a predetermined period immediately after the first major displacement of the valve member. Alternatively, the device may adjust the reference voltage so as to hold the voltage thereof at a level exceeding that of all features of the sensor signal except the signal largest peak during each fuel injection.

21 Claims, 10 Drawing Figures

4,669,440

FUEL INJECTION DETECTING SYSTEM FOR A DIESEL ENGINE

BACKGROUND OF THE INVENTION

This invention relates to a system for detecting fuel injection conditions, such as fuel injection timing and/or period, in a diesel engine.

Diesel engines have fuel injection nozzles or fuel injectors to discharge fuel into combustion chambers. Usually, the nozzle is provided with a valve needle which is lifted intermittently to inject fuel. Lift of the valve needle, thus, reflects the timing and period of fuel injection.

In feed-back control of fuel injection timing and/or rate, the actual fuel injection timing and/or rate needs to be sensed. The fuel injection rate can be derived essentially from fuel injection period and engine rotational speed.

Accordingly, a new sensor is being developed which detects lift of the valve needle and generates a signal indicative thereof. However, the output of such a lift sensor includes noise and adverse components resulting for a variety of reasons.

SUMMARY OF THE INVENTION

It is an object of this invention to provide a system for accurately detecting fuel injection conditions, such as fuel injection timing and/or period, in a diesel engine.

In accordance with this invention, a fuel injection detecting system is used with a diesel engine having a fuel injection nozzle, the nozzle including a movable member for effecting fuel injection into the engine when the valve member is displaced from its normal position and interrupting fuel injection when the valve member is returned to its normal position. The detecting system includes a sensor for sensing displacement of the valve member and generating a signal indicative thereof. A comparator is provided to compare the signal from the sensor with a reference signal and to generate a signal indicative of fuel injection via the nozzle. The detecting system also includes a device for preventing the fuel injection signal from including components unrelated to fuel injection via the nozzle.

These and other objects, features and advantages of this invention will be apparent from the following description of preferred embodiments thereof, taken in conjunction with the drawings.

BRIEF DESCRIPTION OF THE DRAWINGS

Like reference numerals denote like parts throughout the drawings.

DESCRIPTION OF THE PREFERRED EMBODIMENTS

Figure 1:
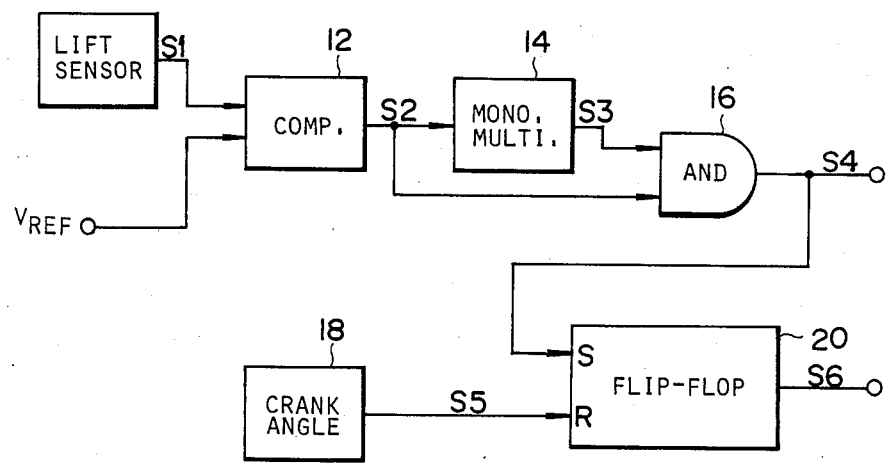
FIG. 1 is a block diagram of a fuel injection detecting system according to a first embodiment of this invention.

With reference to FIG. 1, there is shown a fuel injection detecting system for a diesel engine according to a first embodiment of this invention. The detecting system includes a lift sensor 10 installed in a fuel injection nozzle to sense lift of a valve needle in the nozzle and generate a signal S1 indicative thereof.

Figure 2:
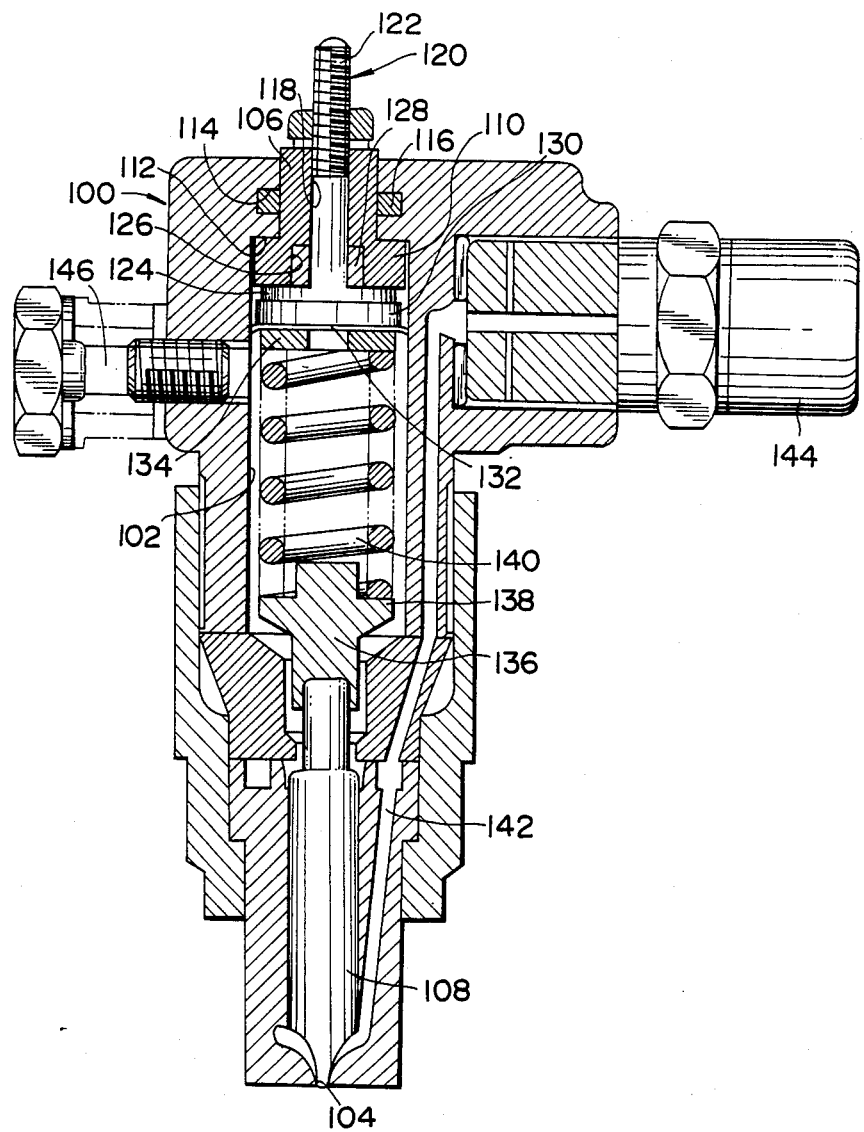
FIG. 2 is a longitudinal section view of a fuel injection nozzle equipped with the lift sensor of FIG. 1.

FIG. 2 shows details of the fuel injection nozzle including the lift sensor 10. The injection nozzle has a body 100 approximately in the form of a cylinder with upper and lower ends. The nozzle body 100 is provided with a coaxial hole 102 extending therethrough. The wall of the nozzle body 100 defining the lower end of the hole 102 tapers radially into the hole 102 in such a manner as to form an injection orifice 104 at the lower end of the hole 102. The upper end of the hole 102 is closed by a cylindrical insulating member 106 coaxially fitting into the upper end of the hole 102.

A cylindrical solid valve needle 108 is coaxially, slideably disposed in the lower part of the hole 102. The outside diameter of the valve needle 108 is essentially equal to the diameter of the lower part of the hole 102 so that the valve needle 108 will be essentially in sealing contact with the nozzle body 100. The lower end of the valve needle 108 is tapered and normally fits into the orifice 104 to abut the inner surfaces of the nozzle body 100 defining the orifice 104 in order to block the latter. Axial movement of the valve needle 108 away from the orifice 104, that is, lift of the valve needle 108, causes the orifice 104 to be opened.

The insulating member 106 has a radial flange 110 at the lower end thereof with the hole 102. The wall of the nozzle body 100 defining the upper end of the hole 102 is provided with a radial shoulder 112 and a circumferential groove 114 above the shoulder 112. The flange 110 abuts the shoulder 112 to limit axially upward movement of the insulating member 106. A sealing ring 116 is located in the groove 114 and abuts both the nozzle body 100 and the insulating member 106 in order to prevent fuel leakage through the upper end of the hole 102.

The insulating member 106 also has a coaxial hole 118 extending therethrough. An electrode 120 has a shaft 122 and a disc flange 124 extending radially from one end of the shaft 122. The electrode 120 is arranged in such a manner that the flange 124 is positioned coaxially within the hole 102 immediately below the insulating member 106 and that the shaft 122 snugly passes through the hole 118. The flange 124 abuts the lower end surface of the insulating member 160 to limit axially upward movement of the electrode 120. The flange 124 is spaced from the nozzle body 100. The insulating member 106 electrically isolates the electrode 120 from the nozzle body 100. The wall of the insulating member 106 defining the lower end of the hole 118 is provided with a circumferential groove 126 extending axially from the lower end surface of the insulating member 106. A sealing ring 128 is located in the groove 126 and abuts both the insulating member 106 and the electrode 120 in order to prevent fuel leakage through the hole 118.

A disc piezoelectric element 130 is coaxially disposed in the hole 102 immediately below the flange 124 of the electrode 120. The outside diameter of the piezoelectric element 130 is chosen so that the element 130 is spaced from the nozzle body 100 in order to be electrically and mechanically isolated from the latter. The piezoelectric element 130 is sandwiched between the flange 124 and a grounding plate electrode 132 disposed in the hole 102. The upper surface of the piezoelectric element 130 contacts the electrode 120, and the lower surface thereof contacts the other electrode 132. The periphery of the electrode 132 contacts the circumferential inner surfaces of the nozzle body 100 defining the hole 102 so that the electrode 132 is electrically connected to the nozzle body 100.

A ring 134 is coaxially disposed in the hole 102 immediately below the electrode 132. A solid cylindrical fitting 136 is coaxially secured to the upper end of the valve needle 108 within the hole 102. The fitting 136 has a radially extending annular flange 138. A compression helical spring 140 is disposed in the hole 102, and is seated between the flange 138 and the ring 134. The spring 140 urges the fitting 136 and the valve needle 108 downwards to normally bring the lower end of the valve needle 108 into contact with the inner surfaces of the nozzle body 100 defining the orifice 104 and thus block the orifice 104. The spring 140 urges the ring 134, the electrode 132, the piezoelectric element 130, the flange 124 of the electrode 120, and the flange 110 of the insulating member 106 upwards against the shoulder 112 of the nozzle body 100. The electrode 132 is designed so as to transmit mechanical force between the ring 134 and the piezoelectric element 130 while maintaining electrical contact with the nozzle body 100.

A fuel passage 142 is provided within the walls of the nozzle body 100. One end of the fuel passage 142 communicates with the outlet of a fuel injection pump (not shown) via a suitable pipe (not shown) and a fuel inlet 144 secured to the nozzle body 100. The fuel injection pump supplies pulsatively pressurized fuel to the fuel passage 142. The other end of the fuel passage 142 opens into the lower end of the hole 102 at such a position that the pressure of fuel introduced into the lower end of the hole 102 via the fuel passage 142 will be applied to the tapered surfaces of the lower end of the valve needle 108 to exert an upwardly directed force on the valve needle 108.

A vent or drain 146 is secured to the nozzle body 100. The drain 146 communicates with the hole 102 above the valve needle 108 to allow fuel which has leaked from the lower end of the hole along with the periphery of the valve needle 108 to exit from the nozzle body 100.

When the pressure of fuel introduced into the lower end of the hole 102 exceeds a predetermined level, the valve needle 108 is moved up or lifted against the force of the spring 140, opening the orifice 104 to allow fuel injection therethrough. When the pressure of fuel drops below the predetermined level, the valve needle 108 is moved down or returned to its normal position, blocking the orifice 104 to interrupt fuel injection. Lift of the valve needle 108 depends on the pressure of fuel introduced into the lower end of the hole 102 and thus on the fuel pressure applied to the taperd surfaces of the lower end of the valve needle 108.

The nozzle body 100 is mounted onto an engine cylinder head (not shown) in such a conventional manner that the injection orifice 104 opens into an engine combustion chamber (not shown) to allow fuel to be injected into the combustion chamber.

As the valve needle 108 is moved up and down to initiate and interrupt fuel injection, the force exerted on the piezoelectric element 130 varies because the force due to the pulsative fuel pressure is transmitted to the piezoelectric element 130 via the valve needle 108, the fitting 136, the spring 140, the ring 134, and the electrode 132. Variations in the force exerted on the piezoelectric element 130 cause the piezoelectric element 130 to produce a varying electromotive force reflecting the mechanic force. The resulting voltage is outputted via the electrode 120, and via the electrode 132 and the nozzle body 100 as an output S1 of the lift sensor 10. Toward this end, the nozzle body 100 should be made of electrically conductive material.

Figure 3A:
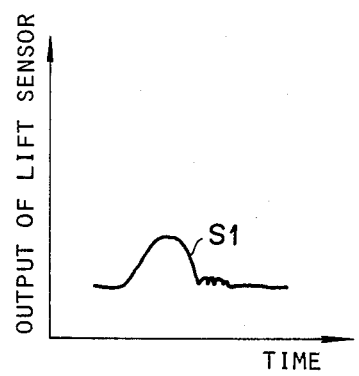
FIGS. 3A and 3B are graphs showing waveforms of the output of the lift sensor in FIGS. 1 and 2 obtained at lower and higher engine rotational speeds respectively.
Figure 3B:
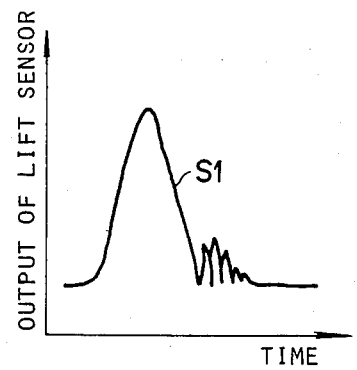

As shown in FIGS. 3A and 3B, the voltage of the output S1 of the lift sensor 10 rises and drops as the force transmitted to the piezoelectric element 130 increases and decreases, that is, as the valve needle 108 moves up and down. In other words, the voltage output S1 varies in accordance with the variation of lift of the valve needle 108. After the highest, broadest peak, there are some brief, low-amplitude oscillations in the voltage output S1 before the voltage output S1 returns to its initial value. These oscillations result from the fact that the valve needle 108 bounces immediately after the valve needle 108 first returns to its normal or rest position.

FIG. 3B corresponds to the case where the engine rotational speed is greater than that in the case of FIG. 3A. As is apparent from the drawings, the magnitude of the voltage output S1 increases as the engine rotational speed increases. This is because the fuel injection pump is generally driven by the engine so that the maximum value of the pressure of fuel introduced into the lower end of the hole 102 rises according to the increase in the engine rotational speed.

Figure 4:
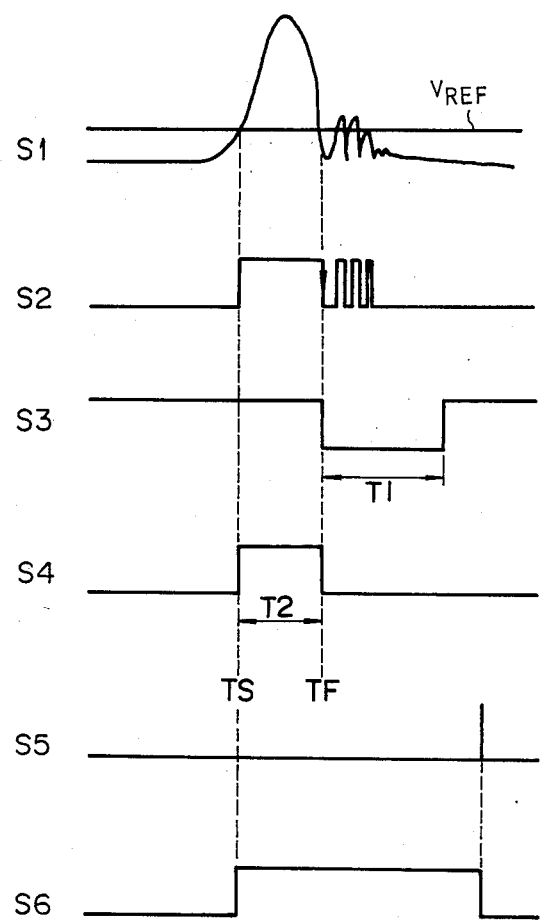
FIG. 4 is a timing chart showing various waveforms produced by the detecting system of FIG. 1.

Returning to FIG. 1, the first input terminal of a comparator or Schmitt trigger 12 is connected to the output terminal of the lift sensor 10, that is, the electrode 120 (see FIG. 2), by means of suitable leads. The connection of the comparator 12 to the lift sensor 10 involves the connection of the grounding terminal of the comparator 12 to the nozzle body 100 (see FIG. 2) and thus to the electrode 132 (see FIG. 2) by means of suitable leads. The second input terminal of the comparator 10 is supplied with a reference voltage $V_{REF}$. As shown in FIG. 4, the comparator 12 generates a digital signal S2 as an output thereof which is high when the lift sensor output S1 is greater that the reference voltage $V_{REF}$ and is low when the lift sensor output S1 is equal to or smaller than the reference voltage $V_{REF}$. In this case, the reference voltage $V_{REF}$ is chosen so that the positive pulse of the comparator output S2 essentially coincides with lift of the valve needle 108 (see FIG. 2). Thus, the rising edge of each positive pulse of the comparator output S2 indicates when lift or upward movement of the valve needle 108 starts, the falling edge thereof indicates when lift or downward movement of the valve needle 108 ends, and the width thereof indicates the period of the lift of the valve needle 108. With repsect to a single lift stroke of the valve needle 108, the comparator output S2 includes the longest positive pulse and other shorter positive pulses following the longest, as shown in FIG. 4. In this case, the longest pulse of the output S2 results from the highest peak in the signal S1, while the shorter pulses result from the oscillations in the signal S1 due to rebound of the valve needle 108.

The input terminal of a monostable multivibrator 14 is connected to the output terminal of the comparator 12. As is shown in FIG. 4, triggered by the falling edge of the pulses of the comparator S2, the multivibrator 14 generates a negative pulse with a preset width or duration T1 as an output S3 thereof. The width or duration T1 of the pulses of the multivibrator output S3 is chosen to be longer than the maximum of a time for which a group of the oscillations in the sensor output S1 due to rebound of the valve needle 108 occur, but be shorter than the minimum cycle of lift strokes of the valve needle 108, that is the inverse of the highest frequency thereof. As a result, the leading or falling edges of the pulses of the multivibrator output S3 occur when the valve needle 108 first returns to its rest or normal position after the highest peak of lift of the valve needle 108.

The first input terminal of an AND gate 16 is connected to the output terminal of the multivibrator 14, and the second input terminal thereof is connected to the output terminal of the comparator 12. As shown in FIG. 4, the AND gate 16 is closed by the negative pulses of the multivibrator output S3, thereby cancelling the short pulses of the comparator output S2 due to rebound of the valve needle 108. Thus, the output S4 of the AND gate 16 includes only the longest pulses of the comparator output S2. Rebound of the valve needle 108 will not contribute appreciably to fuel injection, since the pressure of fuel introduced into the lower end of the hole 102 is relatively low at that time. Namely, the short pulses of the comparator output S2 due to rebound of the valve needle 108 form adverse components. Each pulse of the AND gate output S4, therefore, accurately reflects the corresponding fuel injection. Specifically, the rising edge of each pulse of the AND gate output S4 indicates the time TS at which each fuel injection burst starts, the falling edge thereof indicates the time TF at which each fuel injection burst finishes, and the width T2 thereof indicates the period or duration of each fuel injection burst. The output terminal of the AND gate 16 may be connected to the input terminal of a well-known pulse-width measuring circuit (not shown) which includes a counter for counting high-frequency clock-pulses during the duration of each pulse of the AND gate output S4 to determine the duration or width T2 of each pulse of the AND gate output S4 and thus determine the period or duration of each fuel injection burst.

The detecting system includes a crank angle sensor or crank angle reference signal generator 18, which has a well-known combination of a magnetic pickup (not shown) and a disc with a radial projection (not shown). The disc is mounted on the engine camshaft or crankshaft. The pickup is fixedly located near the disc so that a voltage wave develops across the pickup at a preset crank angle while the engine is in motion. The reference signal generator 18 also has a well-known wave-shaper (not shown), which converts the voltage waves across the pickup into corresponding positive short pulses indicative of the preset crank angle and transmits them as an output S5 of the reference signal generator 18 as shown in FIG. 4.

The set terminal of a flip-flop circuit 20 is connected to the output terminal of the AND gate 16. The reset terminal of the circuit 20 is connected to the output terminal of the reference signal generator 18. Set by the rising edges of the pulses of the AND gate output S4 and reset by the rising edges of the pulses of the reference signal generator output S5, the circuit 20 outputs a digital signal S6 which is high from the time of the rising edge of each pulse of the AND gate output S4 until the time of the rising edge of the subsequent pulse of the reference signal generator output S5 and which is low at other times, as shown in FIG. 4. The width or duration of each resulting positive pulse of the flip-flop circuit output S6 indicates the timing of onset of each fuel injection burst with respect to the preset crank angle defined by the reference signal generator output S5. The output terminal of the circuit 20 may be connected to the input terminal of a well-known pulse-width measuring circuit (not shown) which includes a counter for counting high-frequency clock-pulses during the duration of each pulse of the flip-flop circuit output S6 to determine the duration or width of each pulse of the flip-flop circuit output S6 and thus determine the timing of onset of each fuel injection burst with respect to the preset crank angle.

Figure 5:
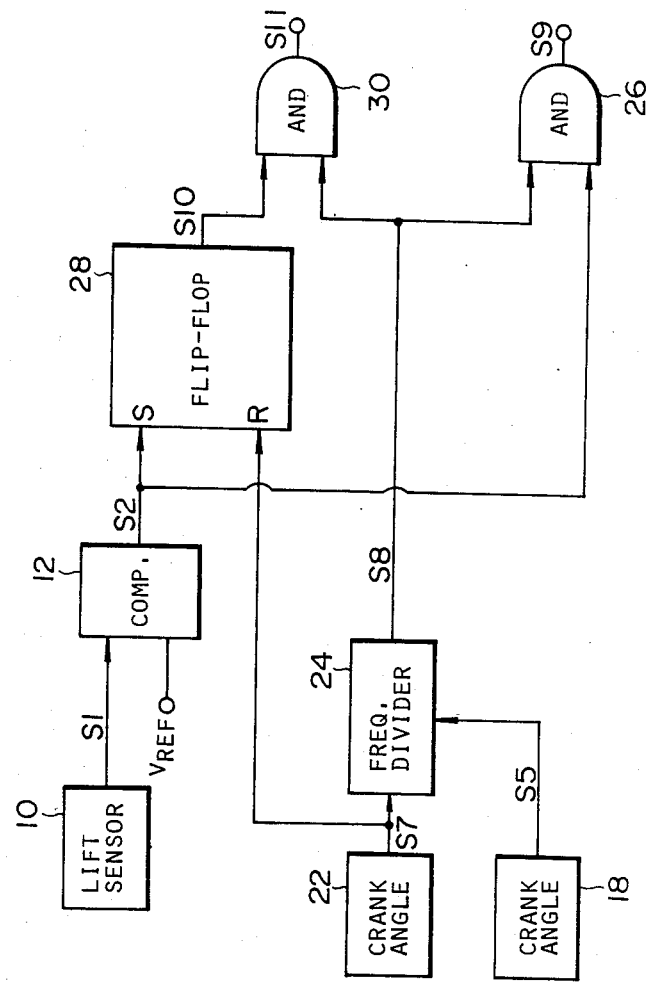
FIG. 5 is a block diagram of a fuel injection detecting system according to a second embodiment of this invention.
Figure 6:
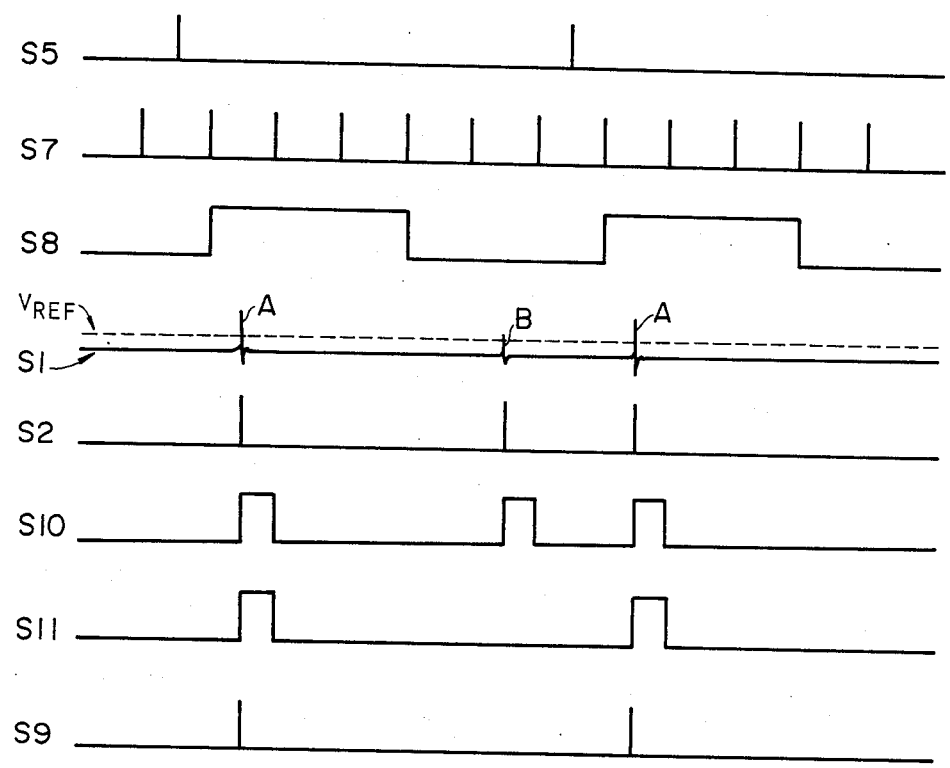
FIG. 6 is a timing chart showing various waveforms produced by the detecting system of FIG. 5.

FIG. 5 shown a second embodiment of this invention, the part of which including the lift sensor 10 and the comparator 12 is designed in a manner similar to that of the corresponding part of the first embodiment. As shown in FIG. 6, the output S2 of the comparator 12 is high only when the output S1 of the lift sensor 10 exceeds the reference voltage $V_{REF}$ applied to the comparator 12.

The engine has a plurality of combustion chambers or cylinders which are supplied with fuel via different fuel injection nozzles. The lift sensor 10 is normally installed in only one of the nozzles. As shown in FIG. 6, the lift sensor output S1 has greater waves A and smaller waves B, the greater resulting from lift of the valve needle 108 (see FIG. 2) in the associated nozzle and the smaller resulting from lift of the valve needle in one of the other nozzles nearest the associated nozzle. In this case, the smaller waves constitute signal noises and therefore should be removed.

The second embodiment also includes a crank angle sensor or crank angle reference signal generator 18, which is identical to that of the first embodiment and thus generates a positive short pulse at a preset crank angle as an output S5 of the reference signal generator 18, as shown in FIG. 6. Specifically, the cycle of the pulses of the reference generator output S5 is 720° in terms of crank angle.

The second embodiment includes a second crank angle sensor or crank angle reference signal generator 22, which is designed in a manner similar to that of the first reference signal generator 18 except for the following arrangement: The disc (not shown) of the reference signal generator 22 mounted on the engine camshaft or crankshaft has more radially symmetrically spaced projections so that the reference signal generator 22 outputs a positive short pulse at regularly-spaced preset crank angles. As shown in FIG. 6, the cycle of the pulses of the output S7 from the reference signal generator 22 is 120° in terms of crank angle in the case of a six-cylinder engine, while each pulse of the output S5 of the first reference signal generator 18 occurs at a time exactly halfway between the adjacent pulses of the output S7. Additionally, the reference signal generator 22 is designed so that each fuel injection burst or lift of the valve needle occurs at a time essentially intermediate between the adjacent pulses of the output S7.

Figure 7:
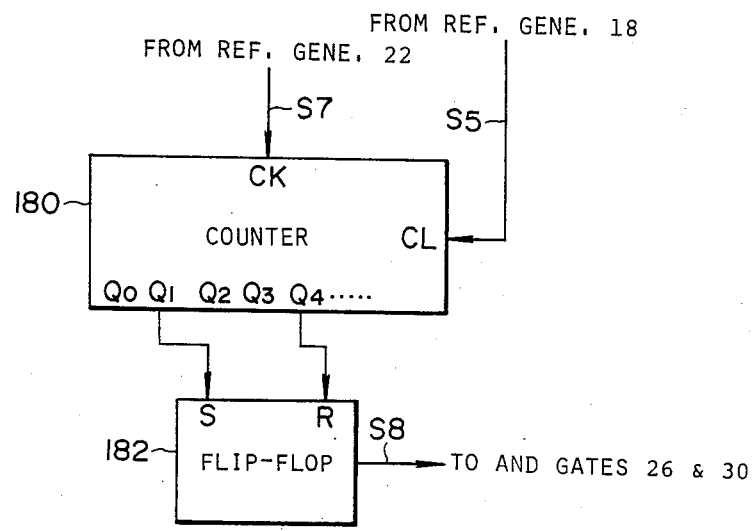
FIG. 7 is a block diagram of the frequency divider of FIG. 5.

A frequency divider 24 is connected to the output terminals of the reference signal generators 18 and 22 to receive the outputs S5 and S7. As is shown in FIG. 7, the frequency divider 24 includes a Johnson counter 180 and a flip-flop circuit 182. The input terminal of the counter 180 is connected to the output terminal of the reference signal generator 22. The clear or reset terminal of the counter 180 is connected to the output terminal of the reference signal generator 18. The counter 180 has more than five output terminals $Q_0$, $Q_1$, $Q_2$, $Q_3$, $Q_4$, ... in a well-known manner. After being cleared or reset by the pulse of the output S5 of the reference signal generator 18, the voltage at the second output terminal $Q_1$ is high only during the first and second pulses of the output S7 of the reference signal generator 22, while the voltage at the fifth output terminal $Q_4$ is high only during the fourth and fifth pulses. The set terminal of the flip-flop circuit 182 is connected to the second output terminal $Q_1$ of the counter 180. The reset terminal of the flip-flop circuit 182 is connected to the fifth output terminal $Q_4$ of the counter 180. Set and reset by the rising edges of the pulses developing at the output terminals $Q_1$ and $Q_4$ respectively of the counter 180, the flip-flop circuit 182 generates a digital signal S8 which serves as the output of the frequency divider 24. The connection of the flip-flop circuit 182 to the counter 180 is chosen so that the "high-level" period of the signal S8 includes the lift period or duration of the valve needle 108 (see FIG. 2) of the nozzle with which the lift sensor 10 is associated, and that the "low-level" period of the signal S8 includes the lift period or duration of the valve needle of the other nozzle nearest the previous nozzle. As shown in FIG. 6, the signal S8 is high from the first to the fourth pulse of the signal S7 after the immediately prior pulse of the signal S5, and is low at other times. The frequency divider 24 may be of the type using a commerically available flip-flop integrated circuit chip, such as "CD4027", in a well-known way.

The first input terminal of an AND gate 26 is connected to the output terminal of the comparator 12. The second input terminal of the AND gate 26 is connected to the output terminal of the frequency divider 24, that is the output terminal of the flip-flop circuit 182 (see FIG. 7). The AND gate 26 is opened and transmits the signal S2 only when the signal S8 is high. Thus, the AND gate 26 removes the unwanted pulses resulting from lift of the valve needle of the nozzle not associated with the lift sensor 10, so that the resulting output S9 of the AND gate 26 includes only the pulses resulting from lift of the valve needle 108 (see FIG. 2) associated with the lift sensor 10, as shown in FIG. 6. The output of the AND gate 26 may be connected to a pulse-width measuring circuit (not shown) to measure the pulse-width of the pulses of the signal S9 to determine the period or duration of each fuel injection burst.

The set terminal of a flip-flop circuit 28 is connected to the output terminal of the comparator 12. The reset terminal of the circuit 28 is connected to the output terminal of the reference signal generator 22. Set by the rising edge of each pulse of the signal S2 and reset by the rising edge of each pulse of the signal S7, the flip-flop circuit 28 generates a digital output S10. As shown in FIG. 6, the signal S10 is high from the time of the rising edge of each pulse of the signal S2 until the time of the rising edge of the subsequent pulse of the signal S7, and is low at other times. The pulse width of each positive pulse of the signal S10 indicates the timing of onset of each fuel injection burst with respect to the preset crank angle.

The first input terminal of an AND gate 30 is connected to the output terminal of the flip-flop circuit 28. The second input terminal of the AND gate 30 is connected to the output terminal of the frequency divider 24. The AND gate 30 is opened and transmits the signal S10 only when the signal S8 is high. Thus, the AND gate 30 removes the unwanted pulses resulting from lift of the valve needle of the nozzle not associated with the lift sensor 10, so that the resulting output S11 of the AND gate 30 includes only the pulses resulting from lift of the valve needle 108 (see FIG. 2) associated with the lift sensor 10, as shown in FIG. 6. The output of the AND gate 30 may be connected to a pulse-width measuring circuit (not shown) to measure the pulse-width of each pulse of the signal S10 to determine the timing of onset of each fuel injection burst with respect to the preset crank angle.

Figure 9:
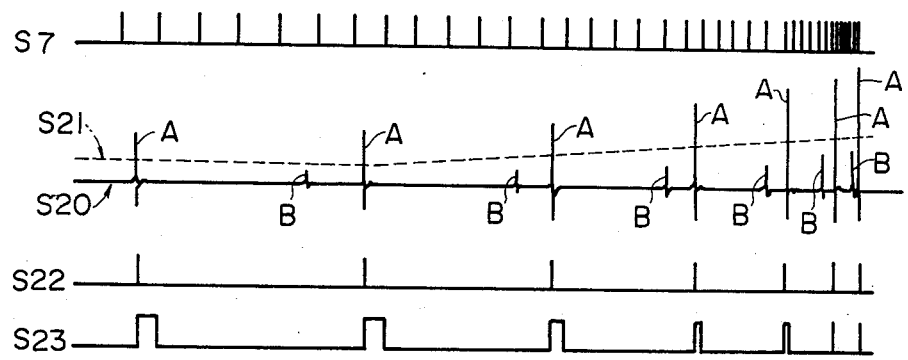
FIG. 9 is a timing chart showing various waveforms produced by the detecting system of FIG. 8.
Figure 8:
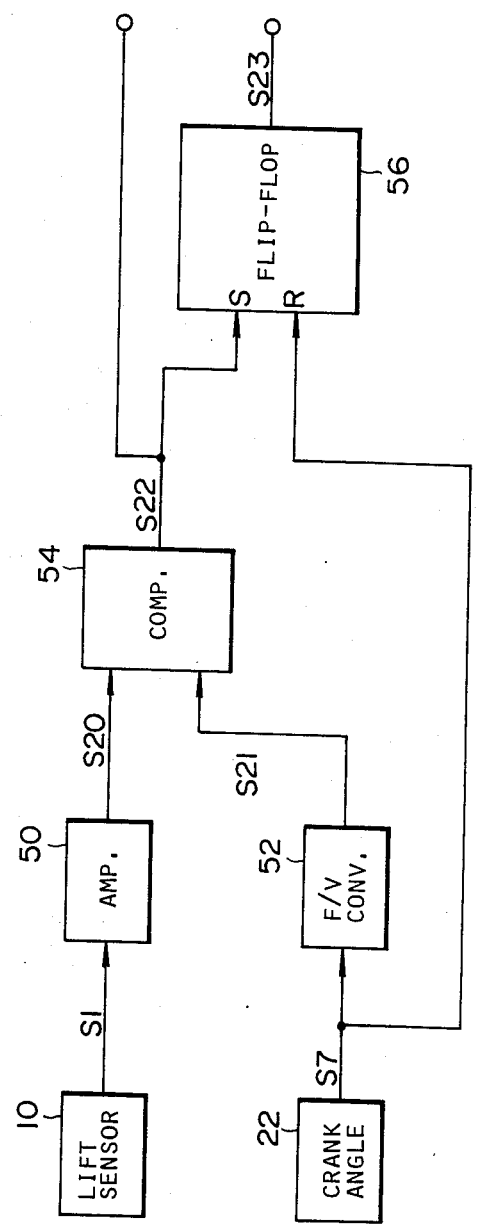
FIG. 8 is a block diagram of a fuel injection detecting system according to a third embodiment of this invention.

FIG. 8 shows a third embodiment of this invention, which includes a lift sensor 10 and an amplifier 50. The lift sensor 10 is identical with that of the first embodiment. The input terminal of the amplifier 50 is connected to the output terminal of the lift sensor 10 to receive the signal S1 therefrom. The amplifier 50 amplifies the signal S1 and outputs an amplified signal S20. The amplifier 50 consists of a well-known combination of an operational amplifier and resistors. As shown in FIG. 9, the signal S20 includes greater waves A and smaller waves B, the greater resulting from lift of the valve needle 108 (see FIG. 2) in the nozzle associated with the lift sensor 10 and the smaller resulting from lift of the valve needle in one of the other nozzles nearest the previous nozzles. The magnitudes of both the waves A and B increase as the engine rotational speed increases.

The third embodiment also includes a crank angle sensor or crank angle reference signal generator 22, which is identical with that of the second embodiment and thus generates a pulse at regularly-spaced preset crank angles. As shown in FIG. 9, the cycle of pulses of the output signal S7 from the reference signal generator 22 is 120° in terms of crank angle in the case of a six-cylinder engine.

The input terminal of a frequency-to-voltage converter 52 is connected to the output terminal of the reference signal generator 22. In response to the signal S7, the converter 52 generates an analog signal S21 whose voltage is proportional to the frequency of pulses of the signal S7, as shown in FIG. 9. Since the frequency of pulses of the signal S7 is proportional to the engine rotational speed, the voltage of the signal S21 is ultimately proportional to the engine rotational speed. The converter 52 consists of a well-known combination of operational amplifiers, resistors and capacitors.

The first input terminal of a comparator 54 is connected to the output terminal of the amplifier 50. The second input terminal of the compartor 54 is connected to the output terminal of the converter 52 to receive the signal S21 as a reference voltage. The comparator 54 generates a digital signal S22 in response to the signals S20 and S21. As shown in FIG. 9, the signal S22 is high when the voltage of the signal S20 exceeds that of the reference signal S21, and is low at other times. The gain of the amplifier 50 is chosen so that the peak of each smaller wave B of the signal S20 is slightly lower than the voltgae of the reference signal S21, and that the peak of each higher wave A of the signal S20 is considerably larger than the voltage of the reference signal S21. This relationship between the smaller waves B and the reference signal S21, and that between the higher waves A and the reference signal S21 are maintained at all engine rotational speed ranges, since the magnitudes of the smaller and higher waves A and B, and the voltage of the reference signal S21 are all proportional to the engine rotational speed. Therefore, resulting positive pulses of the signal S22 are all derived from lift of the valve needle in the nozzle associated with the lift sensor 10 and thus precisely reflect fuel injection. Specifically, the width of each pulse of the signal S22 indicates the period or duration of each fuel injection burst, and the rising edge thereof indicates the timing of onset of each fuel injection burst. The output terminal of the comparator 54 may be connected to a pulse-width measuring circuit (not shown) to measure the width of each pulse of the signal S22 to determine the period or duration of each fuel injection burst.

The set terminal of a flip-flop circuit 56 is connected to the output terminal of the comparator 54. The reset terminal of the circuit 56 is connected to the output terminal of the converter 52. Set by the rising edge of each pulse of the signal S22 and reset by the rising edge of each pulse of the signal S7, the flip-flop circuit 56 generates a digital signal S23. As shown in FIG. 9, the signal S23 is high from the rising edge of each pulse of the signal S22 until the rising edge of the subsequent pulse of the signal S7, and is low at other times. The width of each resulting positive pulse of the signal S23 indicates the timing of onset of fuel injection with respect to the preset crank angle. The output terminal of the flip-flop circuit 56 may be connected to a pulse-width measuring circuit (not shown) to measure the width of each pulse of the signal 23 to determine the timing of onset of each fuel injection burst.

It should be understood that further modifications and variations may be made in this invention without departing from the spirit and scope of this invention as set forth in the appended claims.

What is claimed is:

1. A fuel injection detecting system for a diesel engine having a fuel injection nozzle, the fuel injection nozzle including a movable valve member for effecting fuel injection into the engine when the valve member is displaced from its normal position and interrupting fuel injection when the valve member is returned to its normal position, the detecting system comprising:
   (a) means for sensing displacement of the valve member and generating a signal indicative thereof;
   (b) means for comparing the signal from the sensing means with a reference signal and generating a signal indicative of fuel injection via the fuel injection nozzle; and
   (c) means for preventing the fuel injection signal from including components unrelated to fuel injection via the fuel injection nozzle, comprising permitting means for permitting transmission of the fuel injection signal at least during a period of fuel injection via the fuel injection nozzle and interrupting transmission of the fuel injection signal for a preset period, independent of engine operation, said preset period excluding the period of fuel injection via the fuel injection nozzle.

2. A fuel injection detecting system for a diesel engine having a fuel injection nozzle, the fuel injection nozzle including a movable valve member for effecting fuel injection into the enigne when the valve member is displaced from its normal position and interrupting fuel injection when the valve member is returned to its normal position, the detecting system comprising:
   (a) a lift sensor means for generating a signal voltage which varies as a function of displacement of the valve member;
   (b) a comparator means for comparing the signal voltage with a reference voltage and generating a first binary signal representing the result of the comparison;
   (c) a monostable multivibrator triggered by a change of the first binary signal which occurs at a first return of the valve member to a normal position thereof after a peak of displacement of the valve member, the monostable multivibrator generating a noise removing pulse having a leading edge concurrent with said change of the first binary signal and a trailing edge occuring at a preset time after the leading edge; and
   (d) a gate means for deriving a second binary signal from the first binary signal and the noise removing pulse, the second binary signal changing at a change of the first binary signal occurring at a start of displacement of the valve member from the normal position thereof and then changing at a change of the first binary signal occurring at the first return of the valve member to the normal position thereof, the second binary signal remaining constant during a period equal to an interval between the leading and trailing edges of the noise removing pulse, wherein noise is removed from the second binary signal during said period starting from the first return of the valve member to the normal position thereof.

3. A fuel injection detecting system for a diesel engine having a fuel injection nozzle, the fuel injection nozzle including a movable valve member for effecting fuel injection into the engine when the valve member is displaced from a normal position thereof and interrupting fuel injection when the valve member is returned to its normal position, the detecting system comprising:
   (a) means for sensing displacement of the valve member and generating a signal indicative thereof;
   (b) means for comparing the signal from the sensing means with a reference signal and generating a signal indicative of fuel injection via the fuel injection nozzle;
   (c) means for preventing the fuel injection signal from including components unrelated to fuel injection via the fuel injection nozzle;
   (d) said fuel injection nozzle including a body portion, said body portion having a first coaxial passage extending therethrough, said body portion having a wall defining a lower end of said coaxial passage and tapering radially into the passage to form an injection orifice at a lower end thereof, an insulating means fitting into an upper end of said coaxial passage provided for closing said passage, said valve member slideably disposed in a lower part of said coaxial passage and fitting within said injection orifice for closing and opening said orifice,
   said insulating means having a flange within said coaxial passage for limting axial movement thereof, said insulating means further having a second coaxial passage therein;
   an electrode means having a shaft extending through said second coaxial passage and flange means engaging a surface of said insulating means to limit axial movement of said electrode means, said electrode means isolated from said body portion by said insulating means; and piezoelectric means disposed in said first coaxial passage in contact with a surface of said flange of said electrode means, thereby to provide electrical signals to said electrode means in response to fuel pressure in said first coaxial passage.

4. A fuel injection detecting system as recited in claim 3, further comprising a grounding plate electrode means contacting a surface of said piezoelectric means opposite to a surface contacting said flange of said electrode means, said grounding plate electrode means further contacting said body portion, a ring means coaxially disposed within said first coaxial passage below said grounding plate electrode means, and spring means disposed in said first coaxial passage between said ring means and said valve member for biasing said valve member to a closed position in said injection orifice.

5. A fuel injection detecting system as recited in claim 4, wherein said body portion further includes a fuel passageway connected at one end to a fuel inlet, and thereby to an injection pump, and at another end to said injection orifice, said fuel passageway and said valve member shaped to apply pressure to said valve member in a direction to open said injection orifice, said fuel passageway thereby operable for applying fuel to said injection orifice and to said piezoelectric means in response to application of pressurized fuel to said valve member.

6. A fuel injection detecting system as recited in claim 1 wherein said permitting means comprises timing means for generating a timing signal indicative of timing of displacement of the valve member and of fuel injection effected thereby relative to rotation of the engine.

7. A fuel injection detecting system as recited in claim 6 wherein said means for preventing comprises removing means for removing spurious components of said fuel injection signal generated by bouncing of said valve member.

8. A fuel injection detecting system as recited in claim 7 wherein said removing means comprises threshold means for preventing passage of components of said fuel injection signal having an amplitude below a predetermined reference value.

9. A fuel injection detecting system as recited in claim 1, wherein said means for preventing comprises varying means for varying the reference signal in accordance with the rotational speed of the engine.

10. A fuel injection detecting system as recited in claim 9, wherein said means for sensing is operable for generating the signal indicative of displacement to have a voltage depending on displacement of the valve member, and wherein the reference signal has a voltage depending on the rotational speed of the engine.

11. A fuel injection detecting system as recited in claim 1, wherein the permitting means includes means for generating a signal indicative of a predetermined period starting from a time at which the valve member first returns to its normal position after the peak of the displacement of the valve member and ending at a time prior to start of a subsequent purposeful displacement of the valve member, and wherein the interruption of transmission of the fuel injection signal is effected during the period indicated by the signal from the means for generating.

12. A fuel injection detecting system as recited in claim 1, wherein the permitting means includes means for generating a signal indicative of a predetermined period in engine crank angle excluding the period of fuel injection via the fuel injection nozzle, and wherein the interruption of transmission of the fuel injection signal is effected during the period indicated by the signal from the means for generating.

13. A fuel injection detecting system as recited in claim 6 wherein said means for preventing comprises eliminating means for eliminating components of said fuel injection signal generated by displacement of a valve member of a different nozzle adjacent to the fuel injection nozzle.

14. A fuel injection detecting system as recited in claim 13, wherein said means for preventing further comprises crank angle means for generating first and second engine rotation signals indicative of first and second angular displacement periods of the engine and further means responsive to said first and second engine rotation signals for generating a further signal having a first predetermined value at least during times when the valve member is displaced from a normal position thereof and having a second predetermined value during times when the valve member of the different adjacent nozzle is displaced from a normal position thereof.

15. A fuel injection detecting system as recited in claim 14 wherein said further means comprises frequency dividing means clocked by said first engine rotation signal and cleared by said second engine rotation signal for counting a predetermined number of pulses of said first engine rotation signal to generate said first predetermined value of said further signal and for generating said second predetermined value of said further signal during other counts of pulses in said first engine rotation signal.

16. A fuel injection detecting system as recited in claim 14 wherein said eliminating means comprises logic gate means receiving said further signal generated by said further means and said signal indicative of displacement of the valve member to provide an output signal only when said valve member displacement signal coincides with said further signal generated by said further means.

17. A fuel injection detecting system as recited in claim 6 wherein said timing means comprises crank means for generating an engine rotation signal indicative of a predetermined angular interval of engine rotation, and pulse generating means connected to be set by said fuel injection signal and to be reset by said engine rotation signal for producing a pulse representative of a duration of time between said fuel injection signal and a predetermined angular position of the engine.

18. A fuel injection detecting system as recited in claim 17 wherein said means for preventing comprises eliminating means for eliminating components of said fuel injection signal generated by displacement of a valve member of a different nozzle adjacent to the fuel injection nozzle.

19. A fuel injection detecting system as recited in claim 18 wherein said eliminating means comprises reference setting means for setting said reference signal at a value greater than an amplitude of said components of said fuel injection signal generated by displacement of the valve member of the adjacent nozzle.

20. A fuel injection detecting system as recited in claim 1 wherein said permitting means comprises
monostable multivibrating means for generating a pulse of a predetermined duration and voltage level upon termination of a primary pulse of said fuel injection signal and
logic gate means connected to receive sai d fuel injection signal and said pulse of a predetermined duration for providing an output signal only when said fuel injection signal is present and said pulse of a predetermined duration is at a voltage level other than said predetermined voltage level of said pulse.

21. A fuel injection detecting system as recited in claim 20 further comprising timing means for generating a timing signal indicative of timing of displacement of the valve member and of fuel injection effected thereby relative to rotation of the engine,
said timing means comprising crank means for generating an engine rotation signal indicative of a predetermined angular interval of engine rotation, and
pulse generating means connected to be set by said fuel injection signal and to be reset by said engine rotation signal for producing a pulse representative of a duration of time between said fuel injection signal and a predetermined angular position of the engine.

* * * * *